United States Patent [19]

Costello

[11] 4,297,906
[45] Nov. 3, 1981

[54] GEAR BOX

[76] Inventor: Kenneth Costello, 7 Aldwick Close, London S.E.9, England

[21] Appl. No.: 87,176

[22] Filed: Oct. 22, 1979

Related U.S. Application Data

[63] Continuation of Ser. No. 838,013, Sep. 29, 1977, abandoned.

[51] Int. Cl.³ .................. F16H 57/00; F16H 3/08; F16H 57/02
[52] U.S. Cl. .................................... 74/410; 74/375; 74/606 R
[58] Field of Search ............... 74/329, 325, 331, 356, 74/359, 360, 357, 358, 362, 363, 373, 374, 375, 401, 409, 410, 413, 745, 606 R

[56] References Cited

U.S. PATENT DOCUMENTS

| | | | |
|---|---|---|---|
| 1,143,044 | 6/1915 | Fuchs | 74/401 X |
| 1,276,951 | 8/1918 | Oster | 74/329 X |
| 1,380,917 | 6/1921 | McCarrell | 74/359 X |
| 1,439,402 | 12/1922 | Buckwalter | 74/325 X |
| 1,546,672 | 7/1925 | Peacock | 74/359 X |
| 1,676,758 | 7/1928 | White | 74/375 |
| 1,903,221 | 3/1933 | MacKenzie | 74/359 |
| 2,088,581 | 8/1937 | Barnes et al. | 74/375 X |
| 2,206,409 | 7/1940 | Kummich | 74/359 |
| 2,269,215 | 1/1942 | Maier | 74/359 |
| 2,362,925 | 11/1944 | Peterson et al. | 74/359 X |
| 2,600,912 | 6/1952 | Olson | 74/325 X |
| 2,787,167 | 4/1957 | Schwab | 74/359 |
| 2,920,497 | 1/1960 | Wiken | 74/410 |
| 3,046,807 | 7/1962 | Barth et al. | 74/359 X |
| 3,263,521 | 8/1966 | Muller | 74/606 R |
| 3,550,474 | 12/1970 | Maurice et al. | 74/606 R |
| 3,703,107 | 11/1972 | Piret | 74/606 R X |
| 3,745,854 | 7/1973 | Haag et al. | 74/606 R |
| 3,916,712 | 11/1975 | Kelbel et al. | 74/363 X |
| 4,136,574 | 1/1979 | Morrison | 74/359 |

FOREIGN PATENT DOCUMENTS

| 1007185 | 4/1957 | Fed. Rep. of Germany | 74/359 |
|---|---|---|---|
| 2137440 | 2/1972 | Fed. Rep. of Germany | 74/331 |

Primary Examiner—Allan D. Herrmann
Attorney, Agent, or Firm—William A. Drucker

[57] ABSTRACT

A gear box having five forward speeds having an input shaft a lay shaft and a main shaft, the arrangement of the gear box being such that under drive, the input and main shafts are thrust towards one another.

8 Claims, 3 Drawing Figures

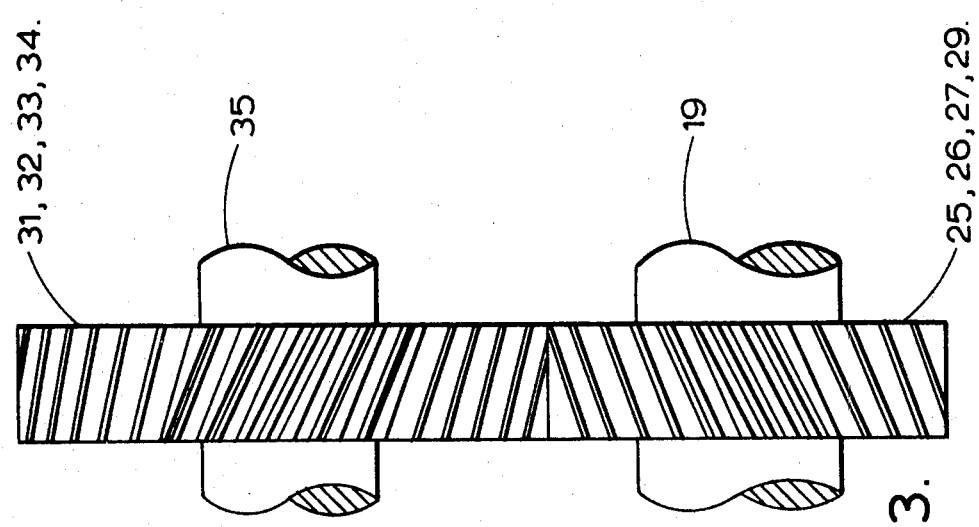
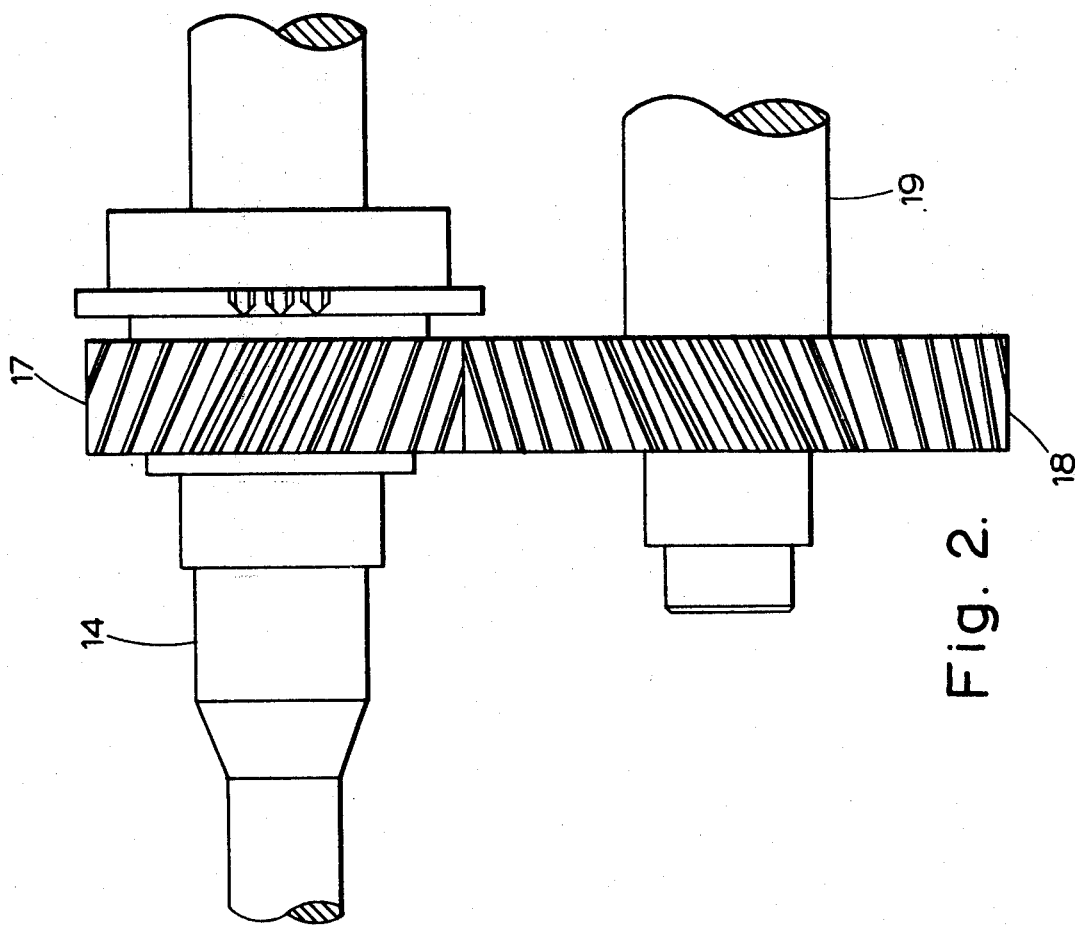

GEAR BOX

This is a continuation of Ser. No. 838,013 filed Sept. 29, 1977, now abandoned.

BACKGROUND OF THE INVENTION

The present invention relates to a gear box.

Conventional gear boxes comprise within a casing, an input shaft, and a main or output shaft coaxial therewith, and a lay shaft alongside and parallel to the main and input shafts. Power is transmitted from the input shaft through a pair of meshing gears to the lay shaft and thence to the main shaft through a selectable pair of gears.

The input and main shaft are mounted by bearing means within the casing and as the gears are normally of a helical type it will be understood that when drive is passing through the gear box there is developed an axial thrust in the various shafts. The gear box must clearly be constructed so as to be able to absorb these axial thrusts.

SUMMARY OF THE PRESENT INVENTION

According to a first aspect, the invention provides a gear box comprising an input shaft, a lay shaft and a main shaft arranged so that, whilst drive is passing through the gear box, the input and main shafts are thrust towards one another. There are considerable advantages in this arrangement. In conventional gear boxes, thrusts tend to move the input shaft and main shaft apart and this thrust has to be absorbed by the opposite end walls of the casing of the gear box. In the present arrangement, the thrusts are towards one another and these can be readily absorbed, for example, in a preferred arrangement by means of a bearing acting between the main and input shafts.

The invention also provides, in a gear box a method of arranging the axial thrusts of the input shaft and main shaft to be towards one another whilst drive is passing through the gear box.

BRIEF DESCRIPTION OF THE DRAWINGS

A preferred arrangement of gear box incorporating the invention will now be described by way of example only and with reference to the accompanying drawings in which:

FIG. 2 is a perspective diagrammatic view of the meshing gears on an input shaft and a lay shaft, and, FIG. 3 is a perspective diagrammatic view of two meshing gears on the lay shaft and main shaft.

DESCRIPTION OF THE PREFERRED EMBODIMENT

Figure 1:
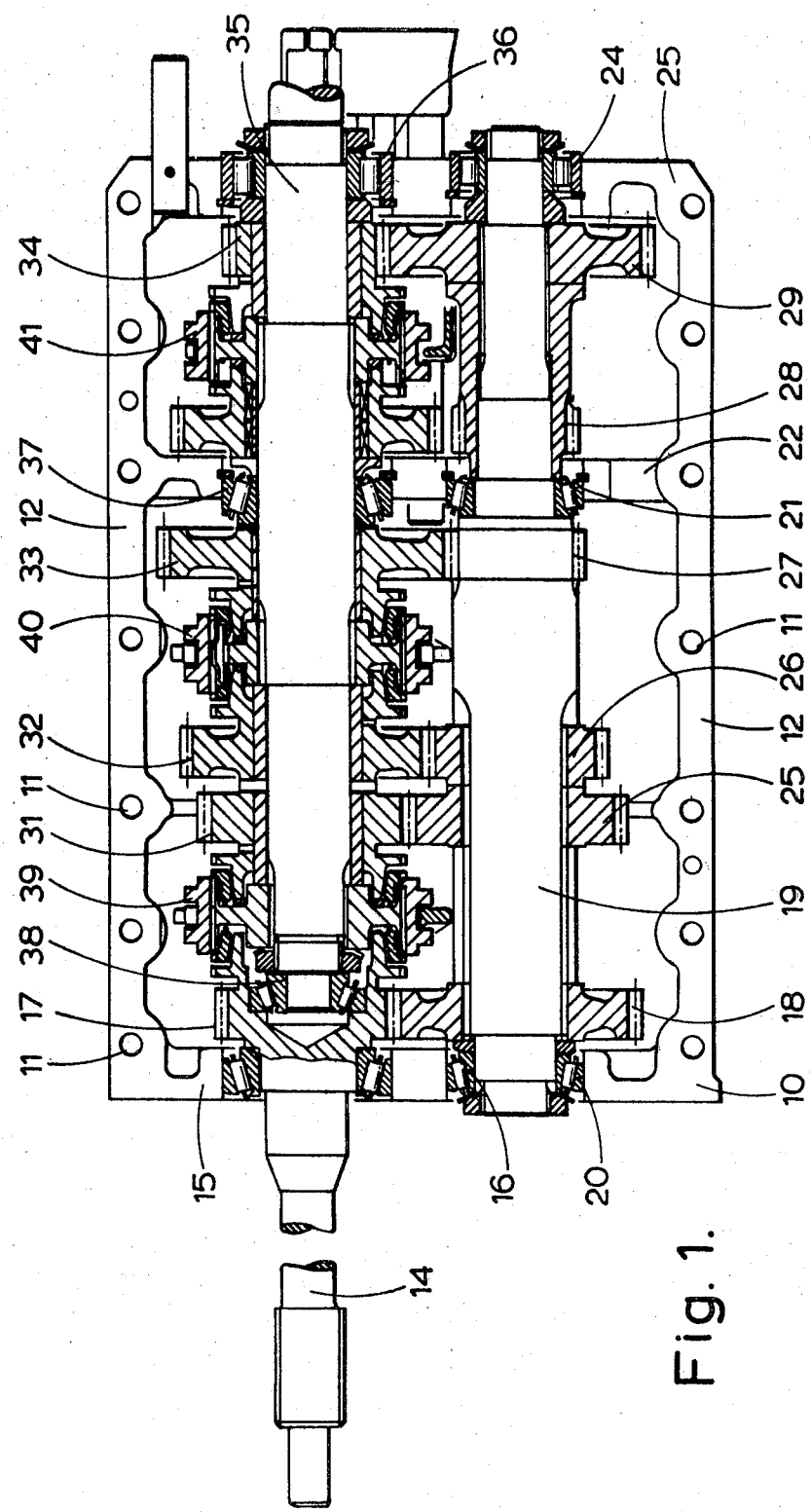
FIG. 1 is a longitudinal section of a five speed gear box incorporating the invention.

Referring to FIG. 1, there is illustrated a gear box comprising a casing 10 which is in two halves (only one half being shown in FIG. 1) which may be split lengthwise, and joined together by suitable connector means in the form of bolts passing through bolt holes 11 spaced around the mating surfaces 12 of the two halves. The casing 10 is of an aluminium alloy for lightness. Projecting from the front end of the casing is an input shaft 14. The input shaft 14 is supported in the front wall 15 of the casing 10 by means of a taper roller bearing 16. Within the casing 10, the input shaft 14 carries a helical toothed input gear 17 which is in constant meshing arrangement with a gear 18 carried by a lay shaft 19. The lay shaft 19 is arranged parallel to the input shaft 14 and is mounted in a taper roller bearing 20 in the front wall 15 of the casing 10, in a taper roller bearing 21 in an intermediate wall 22 of the casing, and in a conventional roller bearing 24 in a rear wall 25 of the casing 10.

The gear box in question is a five speed gear box and the lay shaft 19 carries five further gears 25 to 29. Gear 28 meshes with a reverse gear (not shown in FIG. 1 behind the lay shaft) but gears 25,26,27 and 29 constantly mesh with respective gears 31 to 34 carried by a main shaft 35. As is clear from FIG. 1, the main shaft 35 is supported by a normal roller bearing 36 in the rear wall 25 of the casing 10, by a taper roller bearing 37 carried by the intermediate wall 22 of the casing 10 and by a taper roller bearing 38 mounted in a housing within the helical input gear 17. It will be appreciated that the input shaft 14 and main shaft 35 are coaxial.

The gears 25 to 29 are fixedly mounted to the lay shaft 19 and rotate therewith but the gears 31 to 34 (or the input shaft 14) are selectively connected with the main shaft by generally conventional synchromesh assemblies 39 to 41. (Synchromesh assembly 41 in fact connecting the reverse gear cluster).

Details of the construction of the synchromesh assemblies will be readily apparent from the drawings and no further description is required. Similarily details of the method of mounting for example the bearings within the casing are also conventional and will not be described further.

The gears 17 and 25 to 34 are helical gears. It will be further understood that because they are helical gears when drive is passed to the input shaft 14 then longitudinal thrusts will be exerted on the input shaft 14, the lay shaft 19 and the main shaft 35 as the drive passes through from the input shaft 14 to the main shaft 35. It will be understood from FIG. 2 that the longitudinal thrust in the input shaft 14 is arranged so as to be directed inwardly of the gear box, that is towards the main shaft 35 and the longitudinal thrust in the main shaft 35 is arranged to be directed towards the input shaft 14. Thus whilst drive is passing through the gear box the taper roller bearing 38 is in compression and absorbs both thrusts. Such bearings can be readily designed so as to absorb large thrusts and to a certain extent, therefore, the thrust in the lay shaft 14 and the main shaft 35 cancel each other out and are not passed to the gear box casing. This is in contradistinction to a conventional arrangement of gear box in which the helical teeth are arranged oppositely to that shown in FIG. 2 in which the thrusts in the lay shaft and main shaft are in an outward direction and must be absorbed by the opposite walls of the casing. Thus a lighter weight casing may be utilised in the arrangement of the present invention. In the case of a gearbox designed to operate up to a torque of 260 lb.ft. it is estimated that the weight saved is about 5 lb. Moreover, there is less distortion of the casing and this reduces the possibility of oil leaks through the gaskets in the casing and also allows the use of a split aluminium casing.

The thrust created by the two gears through which drive passes to and from the lay shaft 19 will tend to move the two gears on the lay shaft 19 in opposite directions but this is readily absorbed by the lay shaft 19 since the gears are rigidly mounted to the lay shaft 19. The lay shaft 19 is solid instead of the normally tubular lay shaft and in a gearbox of the size mentioned above is of 1¼ inch diameter.

It is understood, of course, that during over-run, that is, when for example the vehicle to which the gear box is mounted is running downhill, the main shaft 35 will tend to drive the input shaft 14 and the thrusts will be in the opposite direction but the thrust created during such usage are generally less than those involved in normal operation whilst drive is passing from the input shaft to the main shaft.

I claim:

1. A gear box comprising:
   a gear box casing;
   input shaft means for receiving drive whereby to cause said shaft means to rotate in a predetermined direction;
   first mounting means to mount said input shaft means in said casing;
   a first helical input gear means mounted on said input shaft to rotate therewith;
   a lay shaft means;
   a second helical gear means fixedly mounted to said lay shaft means and positioned to engage with said helical input gear means to be rotated thereby;
   further helical gear means fixedly mounted to said lay shaft means;
   main shaft means;
   second mounting means to mount said shaft means in said casing coaxially with said input shaft means;
   thrust bearing means mounted between adjacent ends of said input and main shaft means;
   output helical gear means mounted on said main shaft means to selectively rotate therewith and adapted to engage with said further helical gear means to drive said main shaft;
   the helices of the first helical input gear means and the output helical gear means being such that when the input shaft means is driven in said predetermined direction the input and main shaft means are thrust towards one another, said thrust being absorbed in said thrust bearing means;
   and the helices on said second helical gear means and said further helical gear means being such that when the input shaft means is driven in said predetermined direction the second helical gear means and said further helical gear means are thrust apart from one another, said thrust being absorbed by the lay shaft to which said second helical gear means and said further helical gear means are fixedly mounted.

2. A gear box as claimed in claim 1 in which the first and second mounting means comprise roller bearings in opposite end walls of said casing.

3. A gear box as claimed in claim 1 in which the casing is in two parts, the split between the two parts being generally parallel with the axes of the input, lay and main shaft means.

4. A gear box as claimed in claim 3 in which the split between the two parts of the casing is generally coplanar with the axes of the input, lay and main shaft means.

5. A gear box as claimed in claim 1 in which the thrust bearing between the input and main shaft means is in the form of a taper roller bearing.

6. A gear box as claimed in claim 5 in which the thrust bearing is mounted in a housing within the end of the input shaft means, the adjacent end of the main shaft means extending into the housing.

7. A gear box as claimed in claim 1 in which there are provided four output helical gear means.

8. A gear box as claimed in claim 1 in which the casing is of aluminium.

* * * * *